United States Patent [19]

Magori

[11] 4,375,767

[45] Mar. 8, 1983

[54] FLOW-THROUGH FLOW METER WITH ULTRASOUND

[75] Inventor: Valentin Magori, Munich, Fed. Rep. of Germany

[73] Assignee: Siemens Aktiengesellschaft, Berlin & Munich, Fed. Rep. of Germany

[21] Appl. No.: 267,567

[22] Filed: May 27, 1981

[30] Foreign Application Priority Data

May 28, 1980 [DE] Fed. Rep. of Germany ....... 3020282

[51] Int. Cl.³ .............................................. G01F 1/66
[52] U.S. Cl. ................................ 73/861.18; 73/861.28
[58] Field of Search ............ 73/861.18, 861.27, 861.28

[56] References Cited

U.S. PATENT DOCUMENTS 3,891,869 6/1975 Scarpa ........................ 73/861.27 X

FOREIGN PATENT DOCUMENTS 422958 9/1974 U.S.S.R. .......................... 73/861.27

OTHER PUBLICATIONS

"Flow Measuring Devices", vol. 1, *Part 2 of the AIP and ASME 1974 publication* by R. E. Wendt, Jr. FLOW—Its Measurement and Control in Science and Industry; pp. 897-915, Pittsburgh (1974).

*Primary Examiner*—Charles A. Ruehl
*Attorney, Agent, or Firm*—Hill, Van Santen, Steadman, Chiara & Simpson

[57] ABSTRACT

A transducer is provided for a flow meter wherein the transducer has an interdigital structure of a polarization structure and/or of electrodes for the purpose of direct ultrasonic radiation at an angle α, which is specifiable and electrically controllable, and wherein disturbances of a flow profile by the installed transducer are avoided.

15 Claims, 7 Drawing Figures

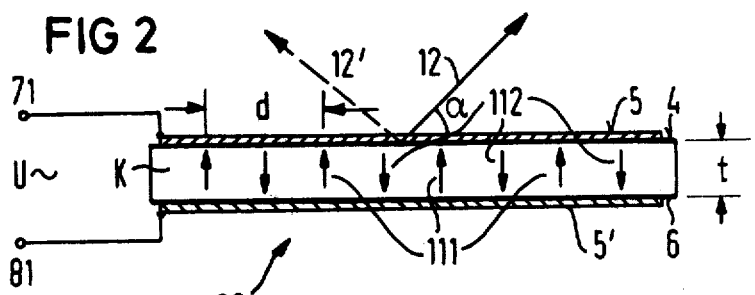
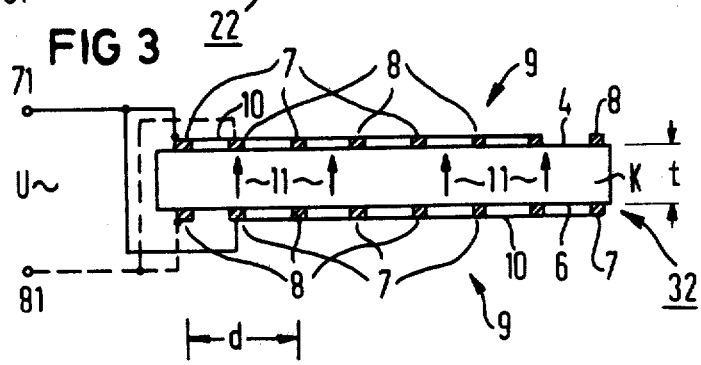
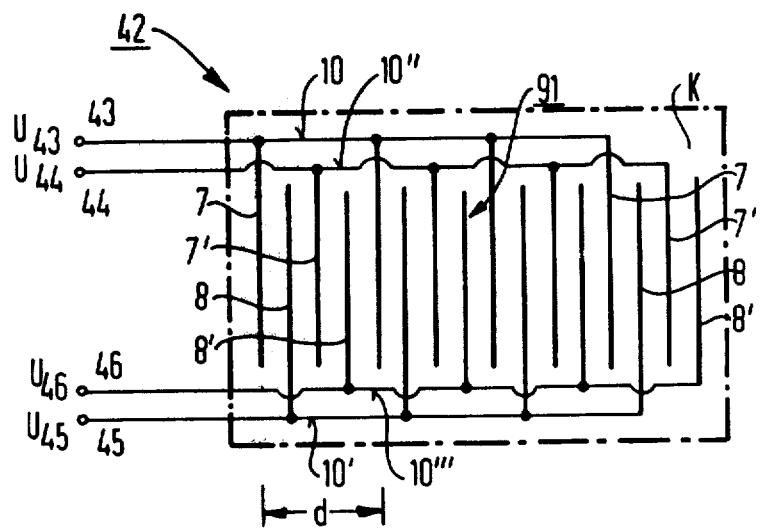

FLOW-THROUGH FLOW METER WITH ULTRASOUND

BACKGROUND OF THE INVENTION

The present invention relates to a flow-through flow meter having ultrasonic transducers for a respective transmission or respective reception of ultrasonic radiation. The transducers are mounted in association with a pipe such that the ultrasonic radiation passing through the flowing medium is analyzed. A difference between the ultrasonic radiation received in the flow direction and the ultrasonic radiation received counter to the flow direction may be utilized as a measure of the flow-through quantity and/or flow-through speed.

From state of the art publications such as "Flow, its Measurement and Control in Science and Industry", Vol. 1, Part 2; and "Flow Measuring Devices", pp. 897-915, Industry Society of America, Pittsburgh (1974) (both incorporated herein by reference), a number of flow-through flow meters operating with ultrasound are known. This latter comprehensive publication refers to many older printed publications. In particular, FIG. 3 (p. 905) and FIG. 4 (p. 907), illustrate arrangements comprising transmitting and receiving transducers whose radiation direction is directed obliquely to the axis of the pipe line, in the interior of which the flowing agent is to be measured with regard to speed and/or flowing quantity. All these embodiments are of such a type that the interior surface of the pipe wall exhibits an interference or fault due to a wedge-shaped depression or a wedge-shaped projection. Such disturbances or interferences of the pipe interior wall, however, are very undesirable, since, on the one hand, they cause disturbances in the flow profile, and hence in the flow resistance, and, on the other hand, they give rise to deposits at this location, whereby these deposits, moreover, also impair the propagation of the ultrasonic radiation.

In order to avoid such difficulties, constructions have been proposed which are illustrated in the above-cited publication in FIG. 6 (p. 908). An unaltered smooth pipe interior wall is present therein, and the transducers for transmission and reception are again mounted with the transmission- or receiving-direction, respectively, obliquely directed relative to the pipe axis. In accordance with one sample embodiment, a notch in the exterior wall of the pipe line is provided in which the respective transducer is mounted. This transducer must radiate, or receive, respectively, its ultrasonic radiation through the pipe wall, whereby, at the boundary surface between the pipe interior wall and the pipe interior volume, a refraction of the propagating ultrasonic radiation occurs which, moreover, is dependent upon changes in the refractive index of the medium flowing in the pipe line.

In another embodiment a transmission member for the ultrasonic radiation is inserted obliquely into the pipe wall, the actual transducer member being applied to the exterior end face of said transmission member. In the region of the interior wall of the pipe line, this transmission member has a surface which is a smooth continuation of the pipe interior wall. In the case of a transmission member of this type, the previously cited effect of radiation refraction takes place.

In an additional embodiment the transducer member is mounted on a coupling block which is secured externally to the pipe wall, whereby likewise the refraction occurs.

These various embodiments for the mounting of the transducer, which have already been known for quite some time, have, as already partially discussed, disadvantages of various types. The embodiments comprising transmission members (FIG. 6 of the publication) are, above all, also less sensitive, since the ultrasound passes through a considerable path distance in a medium, which is not influenced by the respective conditions in the flowing medium.

SUMMARY OF THE INVENTION

It is an object of the present invention to provide, for a flow-through flow meter as described above, additional measures which avoid the disadvantages of the state of the art, such as the formation of flow obstacles and/or deposit spaces, and/or eliminate reductions in the measuring insensitivity.

This object is achieved, for the flow-through flow meter in accordance with the invention, by designing the transducers such that when they are mounted in an interior wall of the pipe line they do not substantially disturb the medium in the pipe line. Each transducer has an interdigital structure associated with a body of the transducer and wherein a thickness of the transducer body is smaller than half a wavelength of the ultrasonic radiation in a material of the transducer body. A periodicity of the interdigital structure satisfies a condition $d=\lambda/\cos^\alpha$ where d is periodicity of the interdigital structure and $\lambda$ is a wavelength in the flowing medium in the pipe line. Connection means are provided to couple an AC excitation voltage with frequency f for providing radiation at an angle $\alpha$ for the given periodicity d.

The invention proceeds from the consideration that these problems, in principle, are to be solved in that the ultrasonic radiation, which is to be necessarily transmitted and received obliquely, preferably at an angle $\alpha \approx 45°$ to the axis of the pipe line, is directly transmitted and received by the surface of the pipe interior wall, or a surface which is at least essentially equal to this surface. This fundamental solution pertaining to this inventive principle consists in installing in the pipe wall one such ultrasonic transducer, respectively, whose transmitting or receiving surface at least essentially is a continuation of the surface of the pipe interior wall. It is preferably even curved like the pipe interior wall, and nevertheless exhibits a transmission or a receiving direction, respectively, for the ultrasonic radiation which has the angle $\alpha$ of the provided transmission direction of the pipe interior space. In the case of this inventive transducer, no refractive effects as in the case of the arrangements known according to FIG. 6 of the above-captioned publication occur. Instead of a curvature of the entire transducer member, a curvature solely of the interior surface also suffices. An additional possibility for the disturbance-free continuation of the pipe interior wall consists in placing an adaptation (or matching) piece of plastic material on the transducer which is planar in the direction of the transducer and, in the direction of the pipe interior, is cylindrically concavely curved (like the pipe interior wall).

In contrast with the transmission members for transducers radiating in a normal direction which are mentioned above and which correspond to the state of the art, refractive influences and their change in the case of agents having a different sonic velocity are virtually of no significance. For the components of the sonic radiation which lie in planes which are parallel to the pipe axis, the inventive adaptation piece acts like a plane-parallel plate. For components which lie in planes which are perpendicular to the pipe axis, the refractive angles are very small, since the radius of curvature of the pipe in relation to the transducer dimensions is great.

The individual transducers employed in the invention have a periodic structure according to the equation $$\lambda = d \cdot \cos \alpha$$

with $\lambda$ = wavelength in the medium of the pipe interior space, and d = the distance between two adjacent fingers of a comb of the periodic interdigital structure, with an additional finger of the opposite comb present in this spacing.

This leads to a radiation from the surface of the transducer member, which radiation is obliquely directed with the angle $\alpha$ relative to the surface of the transducer. This periodic structure can be of an alternating polarity over the length (parallel to the pipe axis) of the transducer member in the material of the transducer member. Consequently, the polarization of the same, which is parallel to the thickness of the transducer member, is directed to be alternatingly anti-parallel with this periodic direction. Another embodiment of the inventive principle provides, on the surface of the transducer member, not facing the pipe interior space, an interdigital structure as the electrode arrangement. This electrode-interdigital structure consists of two inter-engaging comb structures with fingers and a bus bar, respectively. Interdigital structures of this type are known, moreover, from piezo-ceramic transit time arrangements for another purpose.

In a particularly advanced solution in accordance with the invention, a transducer is provided which has a periodically alternating polarization as well as a correspondingly periodically designed interdigital structure on the surface of the transducer member not facing the pipe interior space. This embodiment of the invention, designed to be doubly alternating in the case of excitation with two AC voltages which are phase-shifted relative to one another by 90°, has a transmitting and receiving direction at an angle $\alpha$ to the surface, however, still only in one single direction. The periodicity d according to the above equation applies therein for the distance of such next-adjacent fingers, to which also a repeating polarization corresponds.

An additional, particularly advanced solution has a transducer with a doubled interdigital structure on the one side of the transducer member and a uniform polarization of the transducer member. The excitation proceeds with four AC voltages, which are phase-displaced respectively by 90°, of which one in each instance is placed between one of the four comb structures of the doubled interdigital structure and the common counter electrode of the rear side. This transducer also likewise still radiates only in one direction by the angle $\alpha$.

BRIEF DESCRIPTION OF THE DRAWINGS

FIG. 2 illustrates a second embodiment with periodicity of the polarization;

FIG. 3 illustrates an additional embodiment with an interdigital structure present on both sides;

FIG. 4 illustrates an additional embodiment with a doubled interdigital structure;

DESCRIPTION OF THE PREFERRED EMBODIMENTS

Figure 1:
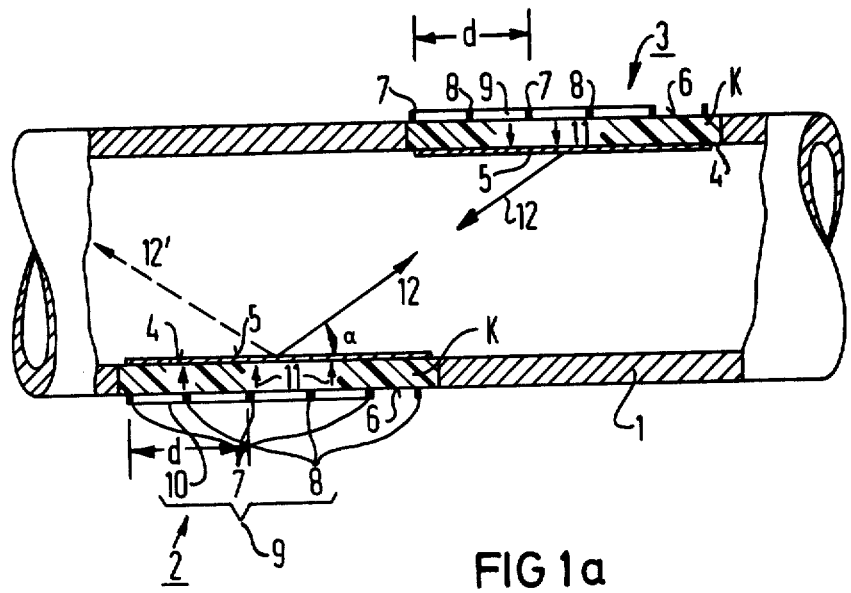
FIGS. 1 and 1a illustrate a first embodiment of a transducer for a flow-through flow meter in accordance with the invention, whereby this transducer has an interdigital structure.

In FIG. 1, 1 designates, in section, the pipe line in which the medium to be measured—not illustrated here—flows, and through the interior space of which ultrasound is emitted or radiated in a manner known per se, with the angle $\alpha$ from a transducer 2 to a transducer 3, and, for the purpose of difference formation, from transducer 3 to the transducer 2. The transducer 2, with a plate-shaped body K of piezo-electrical ceramic material, is installed in the wall of the pipe 1 in such a manner that the pipe interior wall has as small as possible an interruption of its shape. In particular, the interior side 4 of the member K of the transducer 2 can have a curvature corresponding to the pipe interior wall.

The transducer 2 has, on the interior side 4, an electrode coating 5, as is conventional for piezo-ceramic components, which coating, corresponding to the respective flowing medium, is sufficiently resistant, or is protected by an acoustically non-interfering coating, respectively. This electrode coating 5 is preferably electrically conductively connected with the pipe in the form of a connection line.

On the exterior surface 6 of the transducer 2 there is an interdigital structure, known per se, consisting of two comb-like structures interengaging with their fingers, whereby the fingers of each comb structure are connected with one bus bar each. The fingers 7, illustrated in cross-section in the representation of FIG. 1, belong to the one comb structure, and the fingers 8 belong to the other comb structure.

Figure 1A:
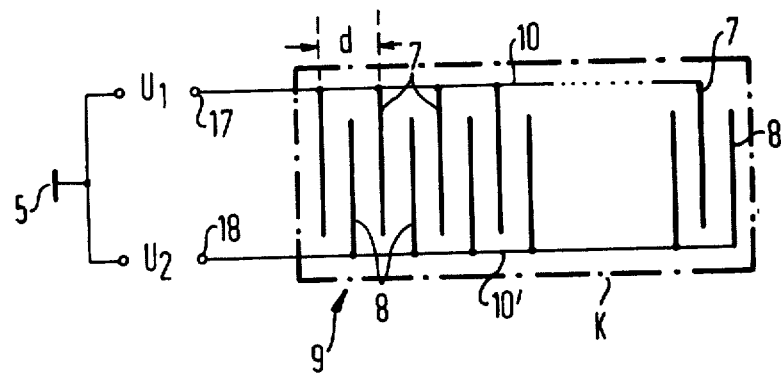

FIG. 1a illustrates, for the purpose of better explanation, the diagram of such an interdigital structure 9 with the fingers 7 and 8 of a respective comb structure. 10 and 10' designate the bus bars interconnecting the respective fingers 8 or 9.

The arrows 11 designate the permanent polarization of the piezo-electric ceramic material of the transducer 2. This polarization direction can also be oppositely directed to the arrows 11 without anything changing in the method of operation of this embodiment according to FIG. 1. The transducer 3 can have precisely the same embodiment as the transducer 2.

The dimension d indicates the periodicity of this interdigital structure. It is also clearly recognizable that, between the two adjacent fingers, respectively, of the one comb structure (7, 10), one finger 8, respectively, of the other comb structure (8, 10') is disposed.

As indicated in FIG. 1a for the purpose of clarity, the finger 7 is connected to the connection of the comb structure and an AC voltage $U_1$, which voltage is connected between the counterelectrode 5 of the interior side and the bus 10; and the finger 8 is connected to the connection 18 of the other comb structure and a second AC voltage $U_2$, which voltage is connected between the counterelectrode 5 and bus 10'. Both AC voltages $U_1$ and $U_2$ have the same ultrasonic transmitting and receiving frequency f of the transducers 2 and 3, they have the same amplitude, and are phase-displaced relative to one another by 180°. This condition and the above-indicated angular relation with the periodicity d provides an ultrasonic radiation 12 radiated as illustrated with the angle α from the member K having a prescribed value, said ultrasonic radiation 12 having a normal (except for the marginal regions) plane wave front relative to the illustrated arrow. The same sharp directional characteristic also applies to the receiving behavior of the transducers 2 and 3.

Basically, the interdigital structure 9 can be applied also on the pipe interior side, and on the body of the transducer 2 or 3, (the counterelectrode 5 can also be applied on the exterior side). However, for reasons of durability of the transducers 2 and 3 alone, the selection as illustrated of the sides for the interdigital structure and counterelectrode is preferable.

Merely for the purpose of completeness, the embodiment illustrated in FIG. 1 also emits an ultrasonic wave in the direction indicated by 12', which, however, runs to a dead end in the pipe interior and has no useful significance in terms of the inventive flow measurement.

FIG. 2 illustrates, in an enlarged illustration, only the transducer 22 in a specific embodiment for an inventive flow meter such as is to be installed in the pipe wall instead of a transducer 2 and 3.

FIG. 2 illustrates the embodiment with alternating polarization in the body K of the transducer 22; and 111 and 112 designate the respectively opposite polarization directions of the overall polarization of the piezoceramic body K of the transducer 22. Such a periodic structure with the periodicity interval d (in order to satisfy the above equation for radiation at the angle α) is realized by means of a preceding polarization with a corresponding raster or grid shaped electrode. 5 and 5' designate total-surface electrode coatings of the surfaces 4 and 6 of the transducer member K, whereby details regarding such an electrode coating 5 have already been disclosed above. Between these two electrodes, i.e., at the connections 71 and 81, one single excitation AC voltage U∼ with the specified frequency f is applied. The periodicity of the polarization 111, 112 guarantees the damanded ultrasonic radiation at the angle α. The receiving characteristic of such a transducer 22 according to FIG. 2 has a corresponding angle α.

FIG. 3 again shows in an enlarged illustration the specific embodiment of a transducer 32, to be employed for the invention, which, like the transducers 2 and 3, is to likewise be installed in the pipe line wall 1.

11 again designates the polarization of the body K of this transducer 32. This transducer 32 has, on its two surfaces of its ceramic body, one interdigital structure 9 each, such as is illustrated in FIG. 1a; i.e., such an interdigital structure is also present on the pipe interior side. 7 and 8 again designate the fingers of the respective comb structure with the one bus bar 10 visible in the sectional illustration. d indicates again the periodicity according to the above equation. As is also taken into account in the illustration of FIG. 3, the fingers 7 of the interdigital structure of the one surface 4 of the transducer member are electrically connected with the similarly designated fingers 7 of the interdigital structure of the opposite surface 6. Thus, the directly opposite fingers 7, 8, with the respectively opposite connections 71 or 81, are interconnected for the excitation AC voltage U∼. Due to this connection—offset by d/2—of the opposite fingers, or comb structures 7 and 8, respectively, of the interdigital structures, the connection of a single AC voltage of the provided excitation frequency f suffices here in order to attain the radiation 12 (and 12') at the angle α to the surface 4, 4'.

FIG. 4 illustrates an embodiment of a transducer for an inventive flow meter in which this transducer 42, on its one surface, has, as schematically illustrated, a doubled interdigital structure with the periodicity d. For the rear side of the transducer 42 there suffices, as the counterelectrode, a total-surface metallization (as in the examples of FIGS. 1 and 3).

As illustrated, the doubled interdigital structure 91 consists of a total of four comb structures with one bus bar 10, 10', 10'', 10''' each. The two bus bars 10 and 10' are disposed on the one marginal side of the doubled interdigital structure. The bus bar 10 has the illustrated fingers 7, and the illustrated fingers 7' belong to the bus bar 10''. The fingers 7 and 7' of the two comb structures alternate with one another, as is apparent from FIG. 4. Engaging interdigitally thereto, i.e., into the comb structures with the fingers 7 and 7', are the comb structures with the fingers 8 and 8', whereby as illustrated, the fingers 8 are connected with the bus bar 10' and the fingers 8' are connected with the bus bar 10'''. The connections of the individual comb structures, or of the bus bars 10 through 10''', respectively, are referenced 43, 44, 45 and 46. Between the connection 43 and the non-illustrated total-surface counterelectrode of the rear side of the transducer 42, a first AC voltage $U_{43}$ with the provided ultrasonic frequency f is to be connected. Between the connection 44 and the cited counterelectrode a second AC voltage $U_{44}$ is to be connected which has a +90° phase displacement (or shift) relative to the voltage $U_{43}$. Between the connection 45 and the counterelectrode an AC voltage $U_{45}$ with a +180° phase displacement (or shift) relative to $U_{43}$ is to be connected. Finally, between the connection 46 and the counterelectrode an AC voltage $U_{46}$ with a +270° phase displacement relative to $U_{43}$ is to be connected. These four AC voltages $U_{43}$ through $U_{46}$ have the same frequency and the same amplitude. The permanent polarization of the body of the transducer 42 is, in the thickness direction of the same, equally great in the entire body and equidirectional; i.e. uniform.

The transducer 42 according to FIG. 4, has, as an advantage relative to the transducers according to FIGS. 1 through 3, only one radiation direction 12 with the angle according to the abve equation. In the case of an embodiment of a transducer 42 according to FIG. 4, the additional radiation direction, illustrated in broken lines, referenced 12' in FIGS. 1 and 2, is eliminated. In the case of an embodiment according to FIG. 4, disturbances or interferences due to ultrasonic power radiated in a direction 12' are not be to reckoned with; namely, such back reflections which could originate from curved pieces, screwed connections, etc. of the pipe line.

Correspondingly, this transducer according to FIG. 4 also has only a one-sided received sensitivity in solely the direction 12. Thus, this transducer is also insensitive to disturbances brought about by multiply reflected sound waves which would impinge in the pipe line always from the direction 12'.

The elimination of the radiation direction 12' leads to a corresponding amplification of the beam 12 given an equally great electrical AC voltage power expended, and, moreover, leads to a correspondingly increased receiving sensitivity.

Figure 5:
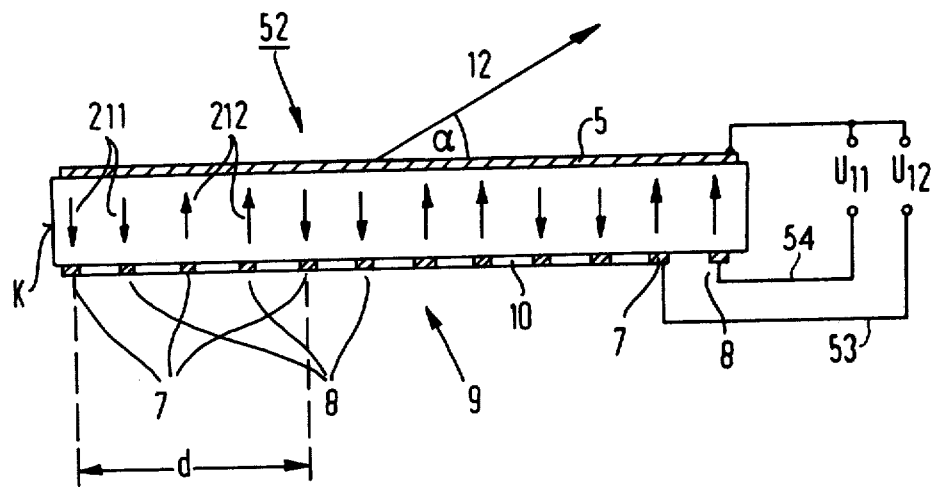
FIG. 5 illustrates an embodiment with an interdigital structure as well as periodicity of the polarization.

FIG. 5 illustrates a further embodiment of the invention whereby the transducer 52 in its piezo-ceramic body K has a periodicity of polarization and, on one side, again preferably the exterior side 6 of the transducer 52 installed in the pipe, also has an interdigital structure 9 according to FIG. 1a. The alternating polarization pertaining to this interdigital structure 9 is indicated by 211 and 212. It is important to recognize that adjacent fingers 7 or adjacent fingers 8 of the one, or of the other, comb structure, respectively, in the body K of the transducer, have a respectively opposite polarization direction 211 and 212, and that the same polarization direction 211 or 212 is again present, respectively, only for the respective second finger 7 or respective second finger 8 of the one or of the other comb structure. In the present case of FIG. 5, the interdigital structure 9, adapted or matched to the alternating structure of the indicated polarization, has the periodicity d, as indicated in FIG. 5.

For the practical embodiment of the transducer 52 according to FIG. 5, as well as also for the transducer 42 according to FIG. 4, (for otherwise equal conditions of angle $\alpha$, the thickness of the body of the transducer, the excitation frequency f, etc.) intervals twice as narrow are present therein between the adjacent fingers 7 and 8 (or 7, 7' and 8, 8' according to FIG. 4) of the entire interdigital structure between the fingers 7, 7', or between the fingers 8, 8' of the respective comb structure. The interdigital structure to be produced of the transducer 42 and 52 according to FIGS. 4 and 5 thus requires twice as high a resolution of the fingers 7, 7', 8 and 8'.

For connection of the interdigital structure 9 of the transducer 52, the fingers 7 are connected by a first common connection 53 and the fingers 8 are connected with a second common connection 54. For excitation of the transducer 52, the two frequency and amplitude equal AC voltages $U_{11}$ and $U_{12}$ are to be applied as illustrated. However, $U_{11}$ and $U_{12}$ (in contrast with FIGS. 1, 1a) need to have a relative phase displacement of only 90°. The 90° phase displacement (or phase quadrature) has the advantage that such a phase displacement can be electronically produced in a simple fashion with a capacitor.

Also, the transducer 52 according to FIG. 5 has only one radiation direction 12 with the angle $\alpha$ according to the above equation, so that, here again, that which has been stated regarding FIG. 4 applies.

Figure 6:
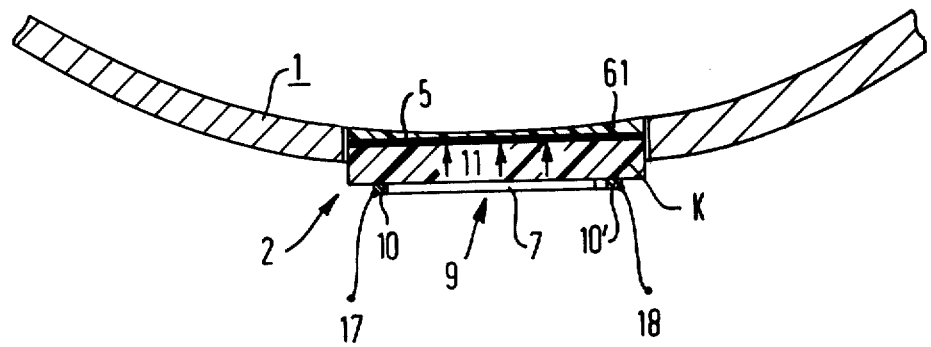
FIG. 6 illustrates an adaptation piece.

FIG. 6 illustrates a sectional view of an adaptation or matching piece 61, as already explained above, such as is employed with equal advantage for the transducer 2 (as illustrated) as well as for all remaining transducers 3, 22, 32, 42 and 52, with a planar transducer body. The reference sign 1 is directed to the pipe.

From the above condition $d = \lambda/\cos \alpha$, there results $\alpha = \arccos (c/f \cdot d)$ with c = sonic speed and f = frequency of the exciting voltage U.

A further advantage of the inventive transducer is that, through mere frequency change of the excitation AC voltage U, the radiation angle i.e., the angle $\alpha$ of the direction 12, can be electrically subsequently adjusted or controlled. This is important not only for an imprecise original installation, but also, for example, for a temperature-conditioned change of the refractive index of the flowing medium. In the case of the invention, a simple automatic fine tuning for optimum transmission and reception can be provided. At the optimum conditions, the relation $c = d \cdot f \cdot \cos \alpha$ applies, with constructively prescribed d and $\alpha$. This means that the value of the sonic speed is $c \sim f$ and can be ascertained from the value f.

The value c of the sonic speed is required in the final (known for ultrasonic flow meters) numerical evaluation, and results here in a simple fashion.

An additional feature of the invention is that the transducer body K is given a thickness t such that the value of the resonance frequency of a thickness vibration mode of the plate-shaped body K is equal to the frequency f of the AC excitation voltage. The frequency f of the excitation voltage is given by the predetermined angle $\alpha$. The simplest way of finding the necessary thickness t for resonance at a given frequency of the transducer is by experiment. This value of resonance frequency of said transducer body K is lower than the respective value of a resonance frequency of an equally shaped plate which has no interdigital structure according to FIG. 2 or 3 as described in the above disclosure. The reason for this lower frequency is that the transducer body with said interdigital structure is nearly free of Poisson effects which otherwise stiffens a body with respect to its resonance frequency.

A transducer body with the above mentioned value t for its thickness has a higher amplitude of ultrasonic vibration. That higher amplitude corresponds to a higher efficiency for transducing excitation voltage into mechanical ultrasonic vibration and vice versa. According to the effect that the phase $\phi$ between excitation voltage and mechanical vibration changes 180° in the neighborhood of the value f of resonance frequency, there is a certain restriction to this special embodiment of the invention to cases in which a change of the value of the resonance frequency f, i.e. according to temperature changes, is small.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A flow-through flow meter adapted for use in a pipe line, comprising: two ultrasonic transducer means for respective transmission and for respective reception of ultrasonic radiation when installed in the pipe line, the radiation being directed relative to an axis of the pipe line obliquely at an angle $\alpha$ through a medium flowing in the pipe line between the transducer means so that a difference between the ultrasonic radiation received in the flow direction and ultrasonic radiation received counter to the flow direction may be utilized as a measure of the flow-through quantity and/or flow-through speed; each of said transducer means being designed so that when they are mounted in an interior wall of the pipe line they do not substantially disturb the medium flowing in the pipe line; each transducer means having associated therewith a material body and an interdigital structure; a thickness t of the transducer body being smaller than half a wavelength of the ultrasonic radiation in the material of the transducer body; a periodicity of the interdigital structure satisfying a condition $$d = \lambda/\cos \alpha$$

where d is the periodicity of the interdigital structure, and $\lambda$ is a wavelength in the flowing medium in the pipe line; and connection means being provided coupled to AC voltage excitation means with a frequency f for radiation at an angle α at the given periodicity d.

2. The meter of claim 1 wherein the interdigital structure comprises a comb-like interdigital structure of electrodes on at least one surface of the body.

3. The meter of claim 1 wherein the interdigital structure comprises an interdigital structure of polarization associated with the transducer body.

4. A flow-through flow meter according to claim 1 wherein the interdigital structure is formed solely by a polarization structure alternating with said periodicity.

5. A flow-through flow meter according to claim 1 wherein said interdigital structure comprises a polarization structure associated with the body which alternates in direction as well as an interdigital electrode structure, the two structures taken together having the same periodicity d, and fingers of a one comb-like structure and fingers of another comb-like structure of the electrode structure having mutually equal intervals of a dimension d/2.

6. A flow-through flow meter according to claim 1 wherein said interdigital structure is formed solely by interdigital electrode arrangements.

7. A flow-through flow meter according to claim 6 wherein on both sides of the transducer body one interdigital structure is provided, each of which have a periodicity and both of which are shifted relative to one another by d/2.

8. A flow-through flow meter according to claim 6 wherein on one side of the transducer body a doubled interdigital structure with two comb-like structures each is provided; on the other side of the transducer body an entire-surface counterelectrode is provided; four AC voltages with a 90° phase displacement in connection with the interdigital structure; and a periodicity being given by an interval between two adjacent fingers of a single one of the comb-like structures.

9. A flow-through flow meter according to claim 1 wherein an entire-surface counterelectrode is arranged on a surface of the transducer body facing the pipe interior.

10. A flow-through flow meter according to claim 1 wherein an interior surface of the transducer body which, when installed and facing an interior space of the pipe line, has such a cylindrical curvature that said interior surface of the transducer body is a continuation of the pipe interior wall.

11. A flow-through flow meter according to claim 1, wherein on a surface of the transducer body, which, in the case of an installed transducer is facing the pipe interior space, an adaptation or matching piece is placed whose surface facing the pipe interior space is cylindrically curved and forms a continuation of the tube interior wall.

12. A method for the operation of a transducer in a flow-through flow meter according to claim 1 wherein said AC voltage excitation means permits a controllable variation of the frequency f of an excitation AC voltage such that an angle α of the ultrasonic radiation can be controllably varied to compensate for changes in a refractive index of the medium flowing in the pipe line.

13. A flow-through flow meter according to claim 1 wherein said transducer body thickness t is chosen such that an ultrasonic vibration of said transducer body is a resonance vibration of the body when excited by said AC voltage excitation means with said frequency f.

14. A flow-through flow meter system, comprising: a pipe line; two ultrasonic transducer means for transmission and reception of ultrasonic radiation installed in the pipe line and wherein said ultrasonic radiation is directed relative to an axis of the pipe line at an angle α through a medium flowing between the transducer means in the pipe line; each of said transducer means being designed so that they conform to an interior wall of the pipe and do not substantially disturb the medium flowing in the pipe line; each transducer means having an interdigital structure associated with a piezo-electric body of the transducer, a thickness of the transducer body being smaller than half a wavelength of the ultrasonic radiation in a material of the transducer body; a periodicity of the interdigital structure satisfying a condition $$d = \lambda/\cos\alpha$$

where d is the periodicity of the interdigital structure, and λ is a wavelength in the flowing medium in the pipe line; and means for coupling an excitation voltage to the transducer means of frequency f which corresponds with ultrasonic radiation at an angle α given periodicity d.

15. A flow-through flow meter according to claim 13 wherein said transducer body thickness t is chosen such that an ultrasonic vibration of said transducer body is a resonance vibration of the body when excited by said AC voltage excitation means with said frequency f.

* * * * *